(12) United States Patent
Ruden

(10) Patent No.: US 7,077,621 B2
(45) Date of Patent: Jul. 18, 2006

(54) DUAL POWERED ACTUATOR SYSTEM

(75) Inventor: Shawn A. Ruden, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 90 days.

(21) Appl. No.: 10/792,956

(22) Filed: Mar. 3, 2004

(65) Prior Publication Data

US 2005/0196264 A1    Sep. 8, 2005

(51) Int. Cl.
  *B66F 11/00* (2006.01)
(52) U.S. Cl. .................... 414/751.1; 901/22; 901/23; 414/749.1
(58) Field of Classification Search ............. 414/749.1, 414/751.1, 752.1, 753.1, 719; 901/16, 22, 901/23, 24; 74/490.08, 490.09; 60/711
  See application file for complete search history.

(56) References Cited

U.S. PATENT DOCUMENTS

| | | |
|---|---|---|
| 3,020,705 A | 2/1962 | Hill |
| 4,543,638 A | 9/1985 | Scarffe |
| 4,669,359 A | 6/1987 | Shiba |
| 4,790,234 A | 12/1988 | Hampejs et al. |
| 5,059,089 A | 10/1991 | Kocaoglan |
| 5,267,478 A | 12/1993 | Stridsberg |
| 5,270,625 A | 12/1993 | Neff |
| 5,345,766 A | 9/1994 | Leonhartsberger et al. |
| 5,511,933 A * | 4/1996 | Herklotz .................. 414/749.1 |

* cited by examiner

*Primary Examiner*—Donald W. Underwood
(74) *Attorney, Agent, or Firm*—Fellers, Snider, et al.

(57) ABSTRACT

Apparatus for a dual powered actuator system. The system comprises a support member supporting an article in movement along a first direction and a second direction. A precision actuator is coupled with the support member and responsive to an input signal to selectively move the support member. A fluid actuator is also coupled with the support member to selectively move the support member. An active fluid regulator provides a first pressure to the fluid actuator in the first direction of the support member and a second pressure to the fluid actuator in the second direction of the support member, wherein the first and second pressures are different. A controller activates the active fluid regulator and the precision actuator.

15 Claims, 4 Drawing Sheets

DUAL POWERED ACTUATOR SYSTEM

FIELD OF THE INVENTION

The claimed invention relates generally to the field of actuating systems for conveying articles and more particularly, but not by way of limitation, to an apparatus for effecting a dual power actuator system.

BACKGROUND

In the field of automated assembly it is common to use linear actuator systems with either a servo-controlled motor for positioning or a pneumatic pressure device for positioning. Servo-controlled systems can become very costly and large in meeting demands for moving large loads at quick velocities, the latter being critical in minimizing cycle time. Pneumatic systems offer the ability accelerate and move large loads quickly, but at the cost of being able to programmably control positioning, velocity and acceleration.

Some solutions have been attempted at combining the benefits of both types of positioning control. In one solution a pneumatic cylinder overrides the servo-controlled motor to provide coarse positioning. Once the coarse position is reached, the servo-controlled motor moves the load to the desired final position.

It has been determined that an optimal solution can be achieved by leaving a servo controlled device engaged for position, acceleration and velocity control across the full range of movement of the load. A fluid-power boost is provided concurrently with the servo-positioning scheme to assist in the rapid coarse movement. The fluid boost provides a first pressure boost in one direction of movement and a second pressure boost in the opposite second direction of movement, wherein the first and second pressures are different. This has proven especially beneficial in the moving of loads against and with the gravitational force associated with moving vertically.

While various approaches have been proposed in the art to address maximizing both speed and control in linear actuator systems, there nevertheless remains a continued need for improvements in the art, and it is to such improvements that the present invention is directed.

SUMMARY OF THE INVENTION

As embodied herein and as claimed below, the present invention is generally directed to a dual powered actuator system. The system comprises a support member supporting an article in movement along a first direction and a second direction. A precision actuator is coupled with the support member and responsive to an input signal to selectively move the support member. A fluid actuator is also coupled with the support member to selectively move the support member. An active fluid regulator provides a first pressure to the fluid actuator in the first direction of the support member and a second pressure to the fluid actuator in the second direction of the support member, wherein the first and second pressures are different. A controller activates the active fluid regulator and the precision actuator.

The first direction can be substantially parallel to a gravitational force, such that the pressure differential is utilized to offset the gravitational force. Alternatively, the first direction can be perpendicular to the gravitational force, or a skewed direction between parallel and perpendicular to the gravitational force.

The fluid actuator can be a pneumatic cylinder or the like, such as but not limited to a hydraulic cylinder or a linear motor. The precision actuator can be a servo controlled motor or the like, such as but not limited to a stepper motor, a voice coil motor or a linear motor.

Embodiments of the present invention contemplate an actuator system for moving an article comprising a support member supporting the article, and means for moving the support member by selectively activating a fluid actuator between first and second pressures and selectively activating a precision actuator. The means for moving can be characterized by moving the article in a first direction substantially perpendicular, parallel, or skewed with respect to a gravitational force.

These and various other features and advantages which characterize the claimed invention will become apparent upon reading the following detailed description and upon reviewing the associated drawings.

DETAILED DESCRIPTION

Figure 1:
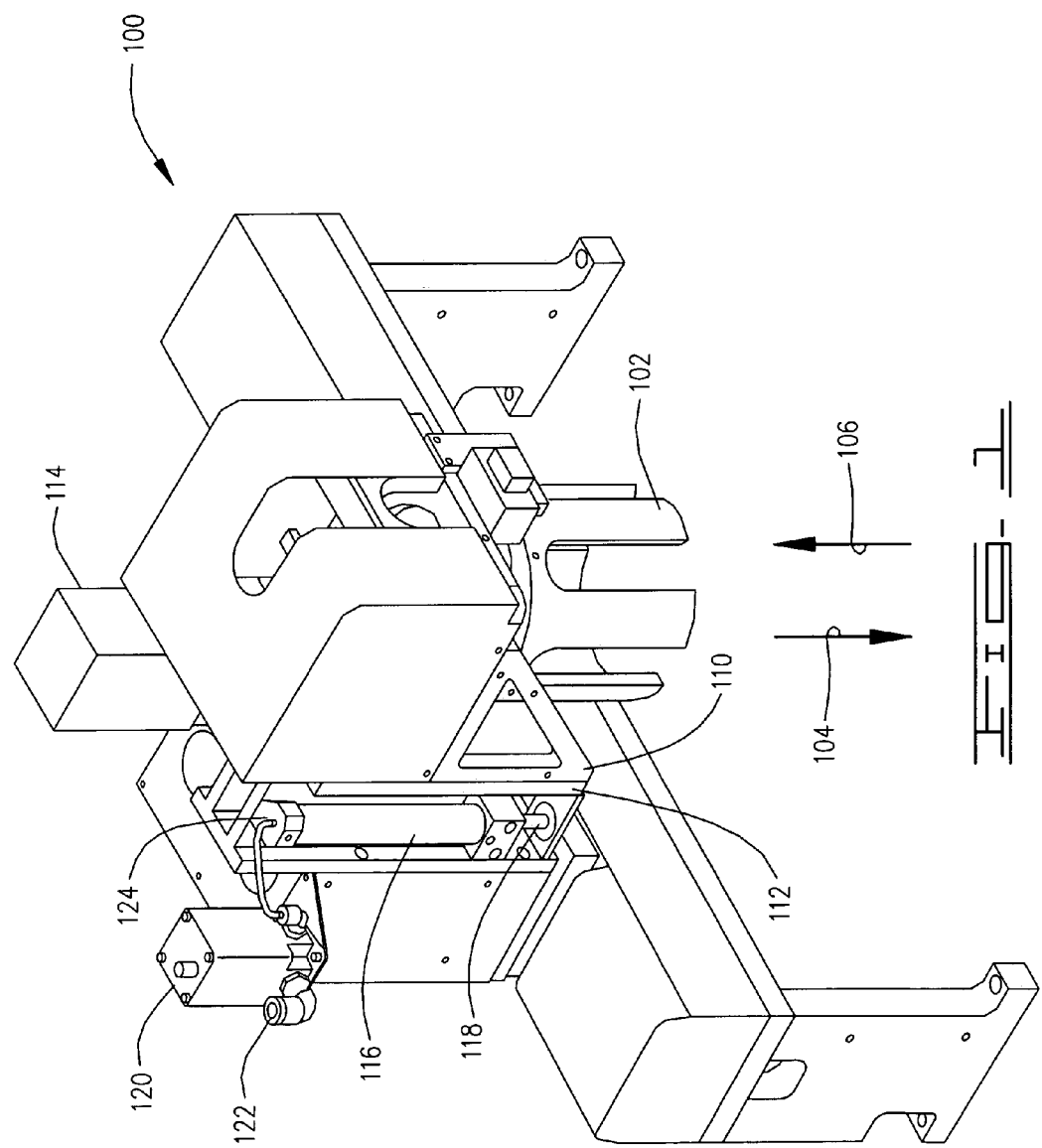
FIG. 1 is an isometric view of a dual powered actuator system constructed in accordance with embodiments of the present invention.

FIG. 1 is an isometric view of an actuator system 100 that is constructed in accordance with embodiments of the present invention. In this arrangement the actuator system 100 moves an load 102 substantially vertically in a first direction designated by reference number 104, and in an opposite second direction designated by reference number 106.

A support member 110 is slidingly coupled to a linear slide 112 for constrained movement along the directions 104, 106. A precision actuator 114 is coupled with the support member 110 and responsive to an input signal, as discussed below, to selectively move the support member 114 in moving the load 102.

Preferably the precision actuator 114 comprises a servo controlled motor that rotationally drives a lead screw through a threaded receptacle attached to a portion of the support member 110. Alternatively, the precision actuator 114 can be a stepper motor, a voice coil motor, a linear motor or the like.

The actuator system 100 further comprises a fluid actuator 116 having an extensible rod 118 that is likewise coupled with the support member 110. Preferably, the fluid actuator 116 comprises a pneumatic cylinder. Alternatively, the fluid actuator can comprise a hydraulic cylinder, a linear motor and the like. The fluid actuator 116 is responsive to an active fluid regulator 120 to selectively move the support member 110. In one embodiment the active fluid regulator 120 comprises an electro pneumatic regulator such as is commercially available from SMC Corporation, model number ITV 2030-31254. The regulator 120 receives a supply air pressure at an inlet 122 and regulates the pressure flowing to the fluid actuator 116 in line 124.

Figure 2:
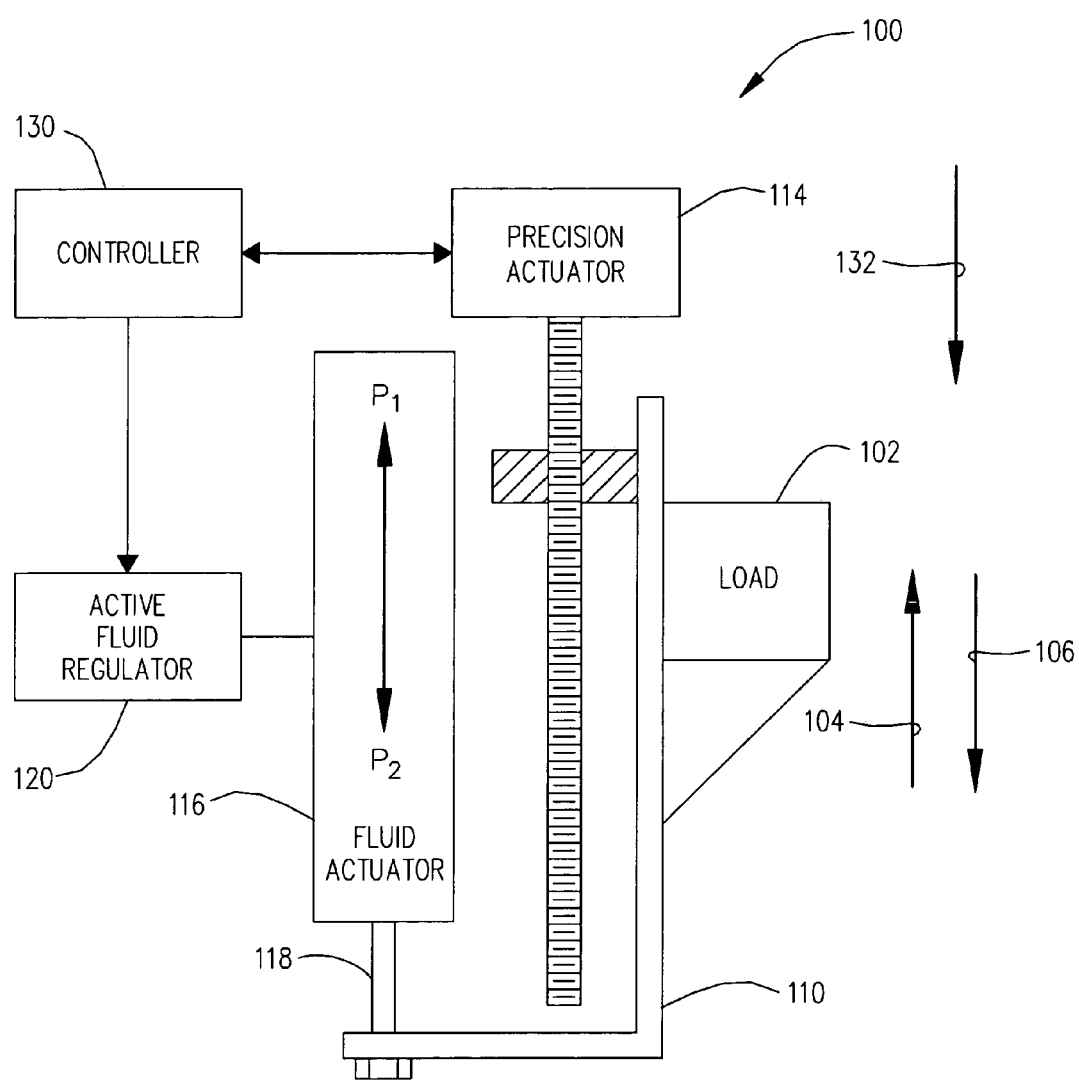
FIG. 2 is a schematic diagram of the system of FIG. 1.

FIG. 2 is a schematic diagram of the illustrative actuator system 100 of FIG. 1. The active fluid regulator 120 provides a first pressure P1 to the fluid actuator 116 in the first direction 104 of the support member 110 and a second pressure P2 to the fluid actuator 116 in the second direction 106 of the support member 110, wherein the first and second pressures P1, P2 are different.

In this manner the fluid actuator 116 provides a "boost pressure" to aid the precision actuator 114 by providing a bias force in the desired direction of movement. In a substantially vertically oriented movement, as illustrated in FIGS. 1 and 2, the boost pressure acts against a gravitational force acting in a direction indicated by reference number 132. Accordingly, for example, assume the load 102 weighs 50 pounds and a five-pound force is desired in order to provide a substantially constant velocity of the load 102 along both directions 104, 106 of travel. The active fluid regulator 120 would provide a first pressure P1 delivering 55 pounds of force in moving the load 102 in direction 104, because the movement is against the gravitational force. The active fluid regulator 120 would then provide a second pressure P2 delivering 45 pounds of force in moving the load 102 in direction 106, because the movement is with the gravitational force. In alternative directions of movement that are not perpendicular to the gravitational force, or skewed directions, the pressures P1 and P2 could be determined trigonometrically according to the angle of incidence with the gravitational force.

Figure 3:
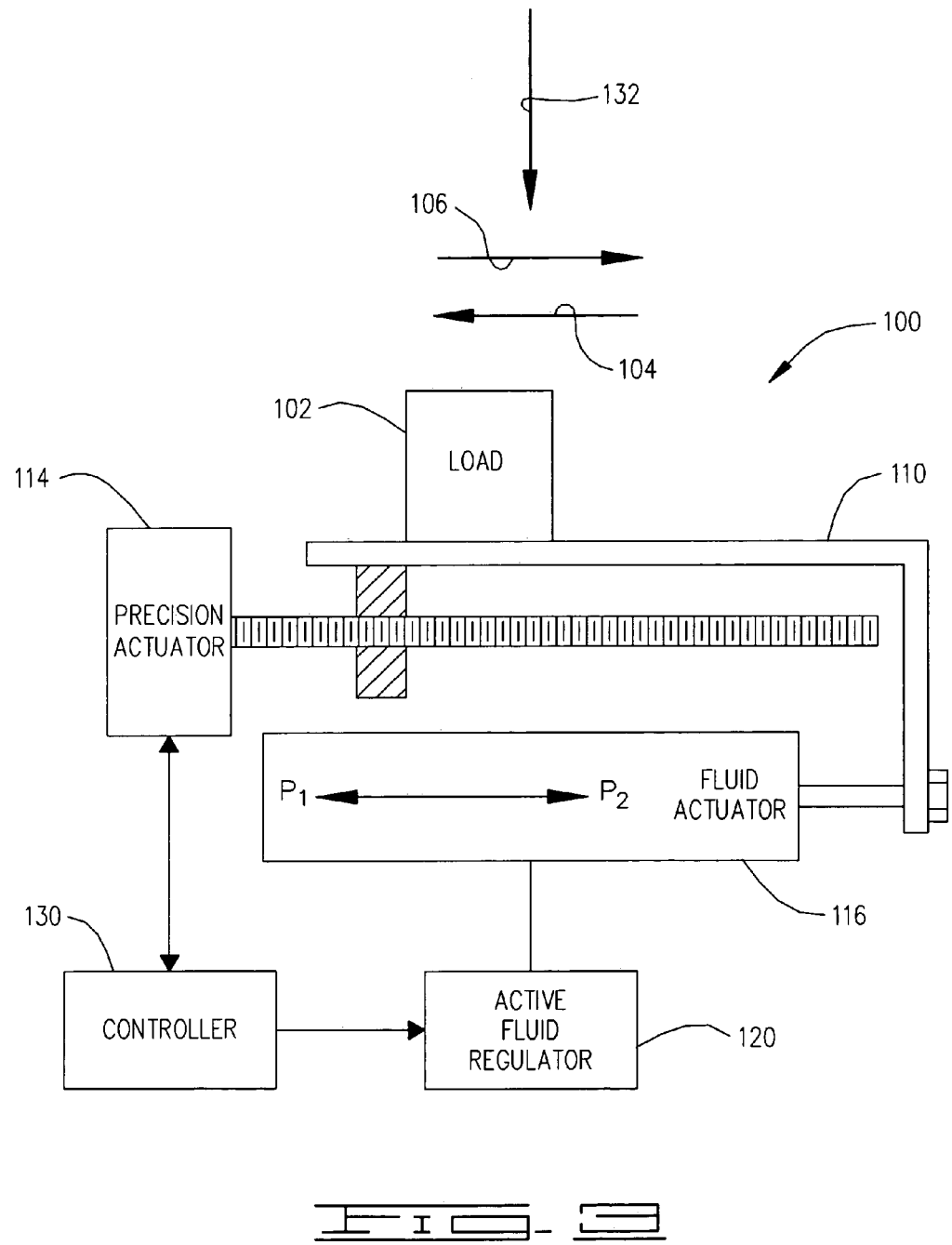
FIG. 3 is a schematic diagram similar to FIG. 2.

FIG. 3 illustratively shows the dual power actuator system 100 can also be used advantageously in moving the load 102 in directions substantially perpendicular to the gravitational force, where the gravitational bias does not come into play. For example, the support member 110 can be used in shuttling components to a manufacturing process. A first lower pressure can be used to move the support member 110 into the process, such as where the need exists to limit the speed to prevent damage to the component or retain it in a fixtured position. A second higher pressure can be used to move the support member 110 out of the process, such as where the component is picked from the support member 110 which returns empty.

The fluid actuator 116 is advantageously used for high acceleration and velocity in moving the support member 110. The precision actuator 114 is alternatively used for position, velocity and acceleration control. A controller 130 activates the active fluid regulator 120 to selectively pressurize the fluid actuator 116 to either P1 or P2, depending on the direction of movement of the support member 110. The controller 130 also activates the precision actuator 114 to finally position the support member 110 at the desired positions culminating in the moves in directions 104, 106.

Figure 4:
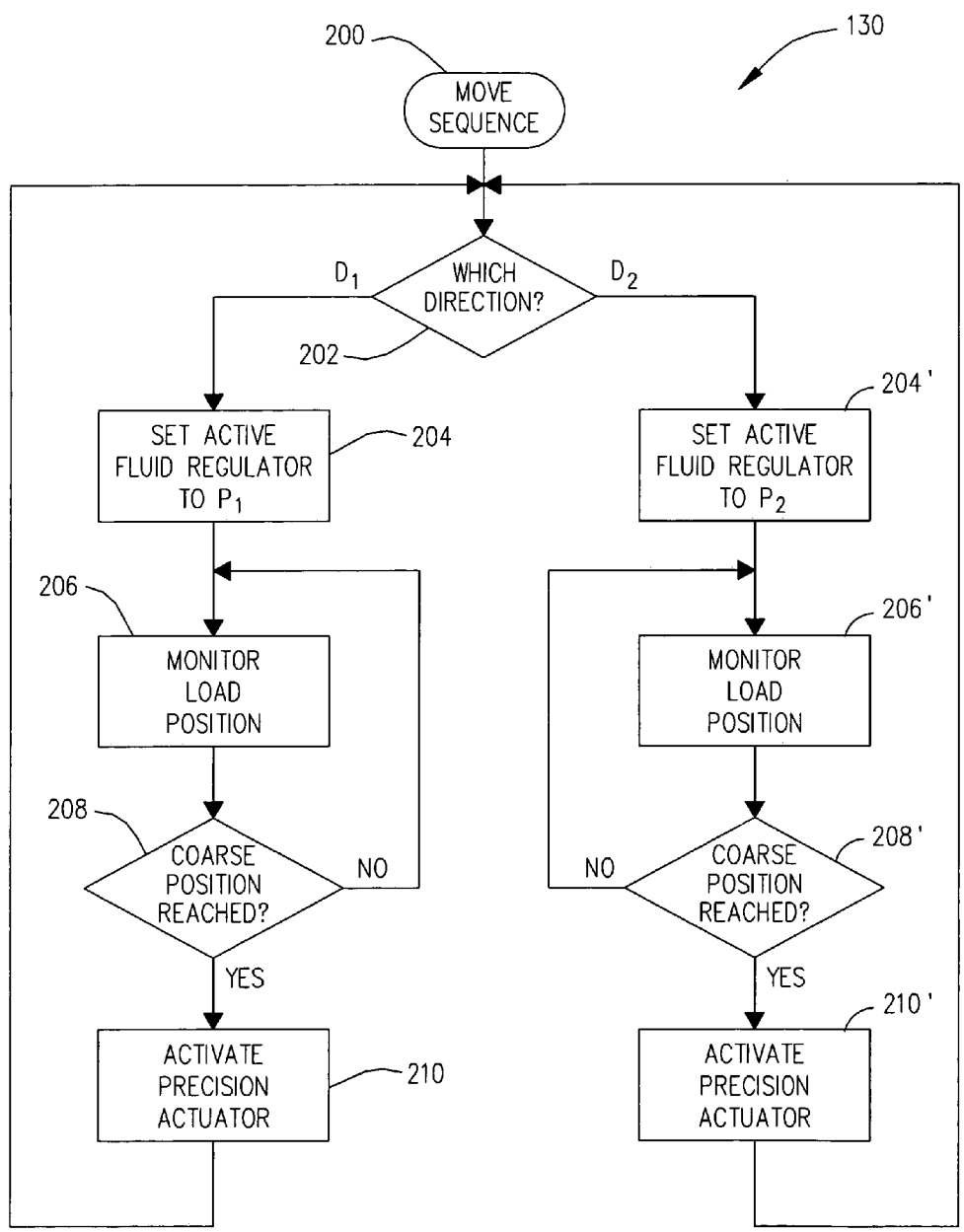
FIG. 4 is a block diagram of a control system for the system of FIG. 1.

FIG. 4 is a block diagram illustrating a control sequence of the controller 130. A move sequence 200 is initiated by determining which direction the move is to be made in decision block 202. For a move in direction D1, for example direction 104 in FIGS. 1 and 2, the controller 130 sets the active fluid regulator 120 to deliver a pressure P1 to the fluid actuator 116 in block 204. Control then passes to block 206 wherein the controller 130 interfaces with the precision actuator 114 to monitor the load 102 positions as it is being moved in direction D1. Decision block 208 determines whether a preselected coarse position has been reached. If no, control passes back to block 206; if yes, then control passes to block 210 wherein the controller 130 activates the precision actuator 114 to fine position the load 102 to the desired final position.

In a similar manner, for a move in direction D2, for example direction 106 in FIGS. 1 and 2, the controller 130 sets the active fluid regulator 120 to deliver a pressure P2 to the fluid actuator 116 in block 204'. Control then passes to block 206' wherein the controller 130 interfaces with the precision actuator 114 to monitor the load 102 position as it is being moved in direction D2. Decision block 208' determines whether a preselected coarse position has been reached. If no, control passes back to block 206'; if yes, then control passes to block 210' wherein the controller 130 activates the precision actuator 114 to fine position the load 102 to the desired final position.

For purposes of the appended claims, the recited means for moving will be understood to correspond to the arrangement whereby the dual acting fluid actuator 116 and the precision actuator 114 cooperatively move the support member 110. The controller 130 assigns a pressure to the fluid actuator 116 depending on the direction of movement. The controller 130 then monitors the position of the support member 110 until a preselected coarse position is reached. At that time the controller 130 activates the precision actuator 114 to fine position the support member 110 to the final desired position.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the housing without departing from the spirit and scope of the present invention.

What is claimed is:

1. A dual powered actuator assembly comprising:
    a precision actuator capable of maintaining position control while moving an article;
    a coarse actuator capable of applying boost forces to the precision actuator;
    an active regulator configured for controlling the coarse actuator to provide a first boost pressure to the precision actuator in a first direction of travel and a second boost pressure different than the first boost pressure to the precision actuator in a second direction of travel different than the first direction; and
    a controller cooperatively activating the active regulator and the precision actuator.

2. The actuator assembly of claim 1 wherein the first direction is substantially perpendicular to a gravitational force bias.

3. The actuator assembly of claim 1 wherein the coarse actuator is a pneumatic cylinder.

4. The actuator assembly of claim 1 wherein the coarse actuator is a hydraulic cylinder.

5. The actuator assembly of claim 1 wherein the precision actuator is a servo controlled motor.

6. The actuator assembly of claim 1 wherein the first direction is substantially parallel to a gravitational force bias.

7. An actuator assembly comprising:
    an end effector engaging an article for displacement in directions non-perpendicular to a gravitational force, the gravitational force establishing a gravitational force bias upon the article;
    a precision actuator capable of maintaining position control of the end effector during displacement;
    a coarse actuator capable of applying boost forces to the precision actuator; and a controller cooperatively activating the coarse actuator and the precision actuator for boosting the precision actuator with a first boost force when moving the end effector in a first direction against the gravitational force bias and boosting the precision actuator with a second boost force less than the first boost force when moving the end effector in a second direction with the gravitational force bias.

8. The actuator assembly of claim 7 wherein the coarse actuator is a pneumatic cylinder.

9. The actuator assembly of claim 7 wherein the coarse actuator is a hydraulic cylinder.

10. The actuator assembly of claim 7 wherein the precision actuator is a servo controlled motor.

11. The actuator assembly of claim 7 wherein the first direction is substantially parallel to the gravitational force bias.

12. The assembly of claim 1 wherein the precision actuator is further responsive to the controller for maintaining velocity control while moving the article.

13. The assembly of claim 12 wherein the precision actuator is further responsive to the controller for maintaining acceleration control while moving the article.

14. The assembly of claim 13 wherein the precision actuator is further responsive to the controller for maintaining velocity control of the end effector during displacement.

15. The assembly of claim 14 wherein the precision actuator is further responsive to the controller for maintaining acceleration control of the end effector during displacement.

* * * * *